Figure 1:

March 22, 1932.          J. R. GUERARD          1,850,929
PROCESS OF ENGRAVING

Filed Aug. 3, 1928

←—Plate

←—Under layer
←—Plate

←—White enamel
←—Under layer
←—Plate

←—White enamel
←—Under layer
←—Plate

←—Heated white enamel
←—Under layer
←—Plate

←—Heated white enamel
←—Under layer
←—Plate

←—Etched plate

Jules Robert Guerard
INVENTOR.

BY

ATTORNEY.

Patented Mar. 22, 1932                                                    1,850,929

UNITED STATES PATENT OFFICE

JULES ROBERT GUÉRARD, OF BAGNOLET, FRANCE

PROCESS OF ENGRAVING

No Drawing. Application filed August 3, 1928, Serial No. 297,381, and in France August 3, 1927.

My invention relates to a process of engraving which is suitable indiscriminately for the production of all sorts of plates, such as lithographic plates, plates in intaglio of copper-plate engraving character, typographical plates in relief, transparent plates and so on.

It is old to cover a surface on which engraving is to be done with a varnish or equivalent coating (mixture of wax and resin, softened gutta-percha, etc.).

The present invention relates to a specific varnish intended for this purpose and by means of which it is possible to obtain all kinds of plates: lithographic, intaglio, relief, transparent, etc. Where the term "transparent plate" is employed, it is intended that the varnish according to the application should be applied on either a transparent or translucent support, such as glass, gelatin, or cellulose fibre. The negative obtained on such support presents an opaque appearance on a transparent base. This varnish is formed of cellulosic ethers or esters and gum resins dissolved in a volatile solvent, the evaporation of which first causes the formation of a jelly from a part of the solid constituents of the varnish, the other solid constituents remaining dissolved within said jelly, solidifying at the end of evaporation in subdivided form. The varnish according to the invention is obtained, for example, by a mixture of a solution of gum resins in alcohol-ether and a solution of the ether or ester of cellulose in acetone. Such a varnish forms on the support receiving it a dry white opaque dull layer or stratum forming a surface resembling that of Bristol board, and hence particularly suitable for drafting or in other words is wear resistant. This layer is not fragile and resists friction. It can still, however, be worked with a point as easily as softer coatings used hitherto, while being superior to these coverings in that it can be completely removed on contact with the tool without any particular skill.

Where the term "resists friction" is employed, it is not intended to state that the stratum of white enamel has any particular coefficient of friction, for applicant is not at all concerned with such coefficient. It is intended to state simply that the stratum of white enamel does not readily deteriorate when rubbed.

The drawings represent by way of example the application of the method by the obtention of a negative in intaglio.

Figure 2:
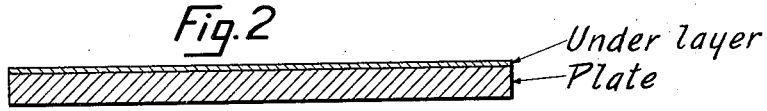
Figure 3:
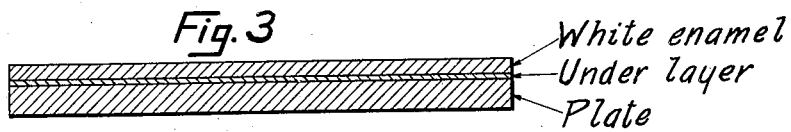
Figure 4:
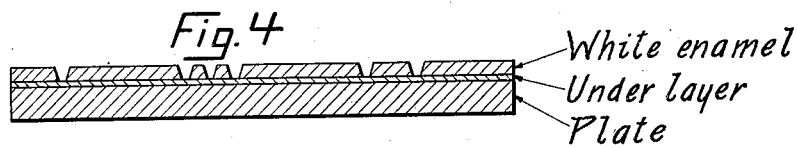
Figure 5:
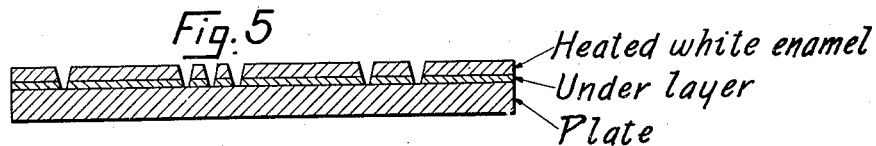
Figure 6:
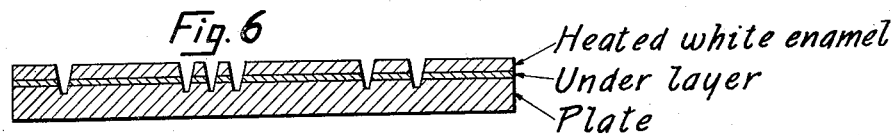
Figure 7:

Fig. 1 is a section of the bare support;
Fig. 2 shows the same support covered by a sub-strata;
Fig. 3 represents the support with the addition of a strata of white enamel above the sub-strata;
Fig. 4 shows the support of the plate after tracing the design;
Fig. 5 is substantially identical with Fig. 4, but illustrates the plate after vitrification of the white enamel strata being heated and after scratching of the sub-strata in intaglio;
Fig. 6 represents the negative after etching; while
Fig. 7 shows the preparation for an impression after elimination of the remainder of the white enamel strata and of the sub- strata.

In addition, and this is extremely surprising in view of its character, this stratum is porous and permeable, that is to say, that it can absorb even an aqueous liquid, which does not inflate or dissolve. It can thus absorb sensitizing baths, and photographic images may be made directly on it.

But if this stratum is heated to a moderate temperature, it softens, ceases to be porous, and after cooling becomes hard and impermeable to aqueous liquids, the lines and the point tracings (etching) being altered. The support may then, by the character given it, be attacked by the usual mordants to pro- duce an intaglio plate.

If the operation is carried out on a gelatinized support the following procedure is employed: the design is traced in intaglio by scratching the white enamel stratum. Where the gelatin is thus exposed, it is painted with a solution of alkaline bichromate. On subsequent exposure to the light the bichromated gelatin is insolubilized around the scratched lines. Subsequently, the white enamel is removed by means of any of its solvents. There is thus obtained in a simple manner a drawing in ink which can be carried over to another support, following the known photolithographic procedure.

The varnish stratum remains soluble in the same solvents after vitrification as before. This circumstance permits easy use of the bitumen process, old per se, and, through final etching of the support, may produce an embossed plate.

On the supporting coating of white enamel the design is traced by scratching the said enamel in intaglio. The support is then heated to vitrify the white enamel. If the support has received a preliminary under-coating before application of the white enamel, the under-coating is then dissolved around the scratched lines. In such cases the negative undergoing preparation is recovered by a coating of bitumen of Judea, dissolved for example in benzine. After dessication, the white enamel is treated by a solvent thereof such for example as methyl alcohol. The solvent is of such nature that it cannot dissolve the bitumen. It merely swells the same, and penetrating by endosmosis through the swollen stratum of bitumen, dissolves the white enamel everywhere the latter still remains. It is then sufficient to lightly rub the stratum of bitumen, for example, through the aid of a plug of cotton, in order to remove the said bitumen except at the scratched lines. An etching of the support at that time permits the obtention of a negative in relief, the support being protected at the scratched lines by means of the bitumen.

Instead of spreading the varnish directly on the support, it is preferable to first apply or produce on said support an adherent under coat of a material whose color differs distinctly from that of the varnish and which is not affected by the tool, in such wise that it protects the metal against biting from the tool. The said under coat which is likewise not affected by the solvents of the varnish, brings out the lines traced on the coat of varnish, without the artist being eventually disturbed by reflection from the support when stripped in the vicinity of the lines. Furthermore the said under coat isolates the coat of varnish from the support and favors the removal of said coat of varnish in the vicinity of the lines. It furthermore checks the direct action of the reagents to which the plate is subjected during the process on the support. When the said under coat is finally destroyed, all of the small impurities are removed with it which would be disposed directly on the support be difficult to make disappear completely and which has always prevented obtaining perfectly satisfactory results.

One may obtain very simply, on most supports, an under coat which is black and very suitable by applying thereto one or several successive coats of a composition having a gallate of iron base such as that given by way of example further on.

I will now indicate by way of example the compositions in their various proportions utilized for carrying my process into practice.

VARNISH FOR WHITE ENAMEL

Solution A

| | |
|---|---|
| Alcohol | 1,000 cubic cm. |
| Ether | 1,000 cubic cm. |
| White gum lac | 100 grams. |

Solution B

| | |
|---|---|
| Alcohol | 250 cubic cm. |
| Sandarach | 25 grams. |

After dissolution solutions A and B are mixed, decanted and then 15 to 20% (according to the quality of the gums employed) of a solution of dry nitrated cotton or celluloid with 10% acetone are added.

UNDER COAT

On the support which is scraped when necessary is spread with a brush the composition below given which is equalized with a large flat brush.

| | |
|---|---|
| Alcohol | 100 cubic cm. |
| Gallic acid | 20 grams. |

After dissolution is added:

| | |
|---|---|
| Water | 200 cubic cm. |
| Perchloride of iron at 45° Baumé | 10 cubic cm. |

The first coat is allowed to dry during which time the color becomes accentuated. One or more additional coats are applied which are allowed to dry also and the whole rubbed with a woolen rag which gives brilliancy to the coat.

For removing the gallate of iron under coat numerous expedients may be employed. I may utilize among other things a 1 to 2% solution of oxalic acid. Furthermore in the embodiment including bitumen, the gallate of iron under coat may very frequently be preserved in the vicinity of the lines.

While I have described what I deem to be the preferable form of my process I do not wish to be limited thereto as various changes might be made in the proportions of the constituent elements employed without departing from the invention as comprehended within the scope of the appended claims.

Having described my invention what I claim as new and desire to secure by Letters Patent is:

1. A method for preparing a surface for the printing which comprises covering a support with a varnish composed of cellulosic derivate and resinous gums in solution with a volatile solvent, evaporating said volatile solvent in order to form a jelly of one of said solid constituents and to separate the remaining solid constituents in finely divided form in said jelly, drying said coat of varnish to render it opaque, friable and porous, and tracing a design by removing the said coating of varnish along the lines of the said design for the purpose disclosed.

2. A method for preparing a surface for the printing, which comprises covering a support with a varnish composed of a solution of resinous gum in ethyl alcohol and ether $(C^2H^5)^2O$ mixed with a solution of cellulosic ester in acetone $(CH^3)^2CO$, evaporating the solvent for drying said coat of varnish to render it opaque, friable and porous, tracing a design by removing the said coating of varnish along the lines of the said design for the purpose disclosed.

3. A method for preparing a surface for the printing, which comprises covering a support with a coat of a substance having adhering properties, of a different shade that the varnish to be subsequently applied thereto and unaffected by the solvent of said varnish or an engraving tool, covering said adherent coating with a varnish composed of cellulosic derivate and resinous gum in a volatile solvent, drying said coat of varnish to render it opaque, friable, and porous, tracing a design by removing the said coating of varnish along the lines of the said design and dissolving the adhering substance along the lines of the design, for the purpose disclosed.

In testimony whereof I hereunto affix my signature.

JULES ROBERT GUÉRARD.